United States Patent
Weissman et al.

(10) Patent No.: US 7,779,039 B2
(45) Date of Patent: Aug. 17, 2010

(54) CUSTOM ENTITIES AND FIELDS IN A MULTI-TENANT DATABASE SYSTEM

(75) Inventors: Craig Weissman, San Francisco, CA (US); Simon Wong, Redwood City, CA (US)

(73) Assignee: salesforce.com, Inc., San Francisco, CA (US)

(*) Notice: Subject to any disclaimer, the term of this patent is extended or adjusted under 35 U.S.C. 154(b) by 1076 days.

(21) Appl. No.: 10/817,161

(22) Filed: Apr. 2, 2004

(65) Prior Publication Data
US 2005/0223022 A1   Oct. 6, 2005

(51) Int. Cl.
*G06F 7/00* (2006.01)
(52) U.S. Cl. ...................................... 707/793
(58) Field of Classification Search .............. 707/3, 707/104.1, 103 Y, 100, 8, 103, 10
See application file for complete search history.

(56) References Cited

U.S. PATENT DOCUMENTS

| | | | | |
|---|---|---|---|---|
| 5,737,592 | A * | 4/1998 | Nguyen et al. ................... | 1/1 |
| 5,794,229 | A * | 8/1998 | French et al. .................... | 1/1 |
| 6,112,209 | A * | 8/2000 | Gusack ............................. | 1/1 |
| 6,173,439 | B1 * | 1/2001 | Carlson et al. ................ | 717/108 |
| 6,275,825 | B1 | 8/2001 | Kobayashi et al. | |
| 6,356,915 | B1 * | 3/2002 | Chtchetkine et al. ........... | 1/1 |
| 6,377,955 | B1 * | 4/2002 | Hartmann et al. ............... | 1/1 |
| 6,587,854 | B1 | 7/2003 | Guthrie et al. | |
| 6,611,840 | B1 * | 8/2003 | Baer et al. ....................... | 1/1 |
| 6,654,039 | B1 | 11/2003 | Hollines et al. | |
| 6,732,100 | B1 * | 5/2004 | Brodersen et al. ............. | 1/1 |
| 6,804,680 | B2 * | 10/2004 | Melli ............................... | 1/1 |
| 6,823,384 | B1 * | 11/2004 | Wilson et al. ............... | 709/225 |
| 7,340,481 | B1 * | 3/2008 | Baer et al. ...................... | 1/1 |
| 7,434,257 | B2 * | 10/2008 | Garg et al. .................... | 726/21 |
| 2002/0133484 | A1 * | 9/2002 | Chau et al. ..................... | 707/3 |
| 2002/0174128 | A1 * | 11/2002 | Govindarajan et al. ...... | 707/100 |
| 2003/0154197 | A1 * | 8/2003 | Millet et al. .................... | 707/9 |
| 2005/0071345 | A1 * | 3/2005 | Lin ............................... | 707/100 |

FOREIGN PATENT DOCUMENTS

WO        WO 01/77787        10/2001

* cited by examiner

*Primary Examiner*—Khanh B Pham
*Assistant Examiner*—Leon Harper
(74) *Attorney, Agent, or Firm*—Townsend and Townsend and Crew LLP; Gerald T. Gray

(57) ABSTRACT

Systems and methods for hosting variable schema data such as dynamic tables and columns in a fixed physical database schema. Standard objects, such as tables are provided for use by multiple tenants or organizations in a multi-tenant database system. Each organization may add or define custom fields for inclusion in a standard object. Custom fields for multiple tenants are stored in a single field within the object data structure, and this single field may contain different data types for each tenant. Indexing columns are also provided, wherein a tenant may designate a field for indexing. Data values for designated fields are copied to an index column, and each index column may include multiple data types. Each organization may also define custom objects including custom fields and indexing columns. Custom objects for multiple tenants are stored in a single custom object data structure. The primary key values for the single custom object table are globally unique, but also include an object-specific identifier which may be re-used among different entities.

1 Claim, 8 Drawing Sheets

Custom_field_definition

| Custom_<br>field_<br>defn_id | Org_<br>id | table<br>name<br>or id | field<br>name | field<br>data<br>name | is_<br>indexed | column-<br>number |
|---|---|---|---|---|---|---|
| 510 | 520 | 530 | 540 | 550 | 560 | 570 |

*FIG. 6A*

Custom_Entity_Definition

| Custom_entity_<br>defn_id | Org_id | entity_<br>name | Key<br>prefix |
|---|---|---|---|
| 610 | 620 | 630 | 640 |

*FIG. 6B*

| account 701 | | 702 name | 703 other standard fields | 711 .account_cfdata | 712 acc id | Val 0 (web address) | 713 Val 1 (stock price) | Val 0 (stock ticker) |
|---|---|---|---|---|---|---|---|---|
| Org id | acc id | | | org id | | | | |
| ood 1 | oo1...1 | ... | ... | | | | | |
| | oo1...2 | | | | | | | |
| ood 1 | oo1....8 | IBM | | ood 1 | oo1....8 | IBM.com | 91.80 | IBM |
| ood 1 | oo1....9 | DELL | | ood 1 | oo1....9 | DELL.com | 33.47 | DELL |
| ood 1 | oo1..10 | APPLE | ... | ood 1 | oo1..10 | Apple.com | 26.03 | AAPL |
| ood 2 | oo1..48 | ... | ... | ... | ... | ... | ... | ... |
| | oo1..86 | | | | | (next annual mtg) | | |
| ood 2 | oo1..87 | Disney | ... | ood 2 | oo1..87 | 20050220 | ... | ... |
| ood 2 | oo1..88 | Pixar | ... | ood 2 | oo1..88 | 20040918 | ... | ... |
| ood 2 | ... | ... | ... | | | | | |
| ood N | oo1..919 | | | | | (Fiscal year) | | |
| | oo1..931 | | | | | | | |
| ood N | oo1..932 | Disney | ... | ood N | oo1..932 | Q3 | ... | ... |
| ood N | ... | ... | ... | | | | | |

"ABC Corp" = rows with ood 1; "123 Corp" = rows with ood 2; "XYZ Corp" = rows with ood N

FIG. 7

| Custom entity id | org id | Val 0 | Val 1 | Val 2 | Val 3 | Val 4 |
|---|---|---|---|---|---|---|
| | | (FK:acc id) | (asset name) | (asset value) | (asset depreciation) | (asset replacement date) |
| ao1....1 | ood 1 | | | | | |
| ao1....2 | ood 1 | | | | | |
| ... | ... | | | | | |
| ao1...38 | ood 1 | | | | | |
| ao2...39 | ood 1 | ... | ... | ... | ... | ... |
| ao2...53 | ood 1 | 001..........9 | ... | ... | ... | 20050601 |
| ao2...54 | ood 1 | 001..........8 | ... | ... | ... | 20060921 |
| ... | ... | | | | | |
| ao2...61 | ood 1 | 001..........10 | ... | ... | ... | 20070331 |
| ao2...90 | ood 1 | | | | | |
| ao1...91 | ood N | ... | | | | |

*FIG. 8*

CUSTOM ENTITIES AND FIELDS IN A MULTI-TENANT DATABASE SYSTEM

BACKGROUND OF THE INVENTION

The present invention relates generally to multi-tenant databases, and more particularly to systems and methods for creating custom objects, such as custom entities and fields, in a multi-tenant database system.

In multi-tenant database systems, such as the salesforce.com service, a multi-tenant architecture is used wherein customer organizations (i.e., tenants) share database resources in one logical database. The database tables themselves are typically shared; each entity in the data model typically contains an organization_id column that distinguishes rows for each tenant. All queries and data manipulation in the context of a tenant filter on this (indexed) organization_id column to ensure proper security and the appearance of virtual private databases. In the salesforce.com system, for example, this strategy is used to expose standard entities such as Account, Contact, Lead, and Opportunity entities to customers.

However, customers may wish to add their own custom data to the database system in addition to the standard entities and fields provided with the standard application. In a traditional client/server application, where the customer has its own physical database, adding custom data is typically done via DDL (data definition language) against that database to create new physical schema—tables and columns. In an online multi-tenant database system, such as the salesforce.com service, this approach may be untenable for various reasons. For example, for a database system with a large population of tenants (e.g., on the order of 1,000 or 10,000 or more tenants), the union of all desired schema would overwhelm the underlying data dictionary catalog (e.g., Oracle dictionary). Additionally, the maintenance of all of these schema objects would be a nearly impossible burden for DBAs (database administrators). Further, current relational databases do not support online DDL (in a highly concurrent transactional system) well enough for organizations to remain logically independent. Specifically, the creation of schema by one organization could lock the application for all other customers causing unacceptable delays.

Accordingly, it is desirable to provide systems and methods that offer a flexible approach to storing variable schema data in a fixed physical schema so as to overcome the above and other problems.

BRIEF SUMMARY OF THE INVENTION

The present invention provides novel systems and methods for hosting variable schema data such as dynamic tables and columns in a fixed physical database schema.

According to the present invention, standard objects, such as tables are provided for use by multiple tenants or organizations. Each organization may add or define custom fields for inclusion in a standard object. In one aspect, custom fields for multiple tenants are stored in a single field within the object data structure, and this single field may contain different data types for each tenant. Indexing columns are also provided, wherein a tenant may designate a field for indexing. Data values for designated fields are copied to an index column, and each index column may include multiple data types. Each organization may also define custom objects including custom fields and indexing columns. In one aspect, custom objects for multiple tenants are stored in a single custom object data structure. The primary key values for the single custom object table are globally unique, but also include an object-specific identifier which may be re-used among different entities.

According to an aspect of the invention, a computer-implemented method is provided for storing multiple fields for multiple tenants in a single multi-tenant data structure. The method typically includes defining a multi-tenant data structure having a plurality of data columns and one or more index columns, defining a first data field for a first tenant, said first field having a first data type, and defining a second data field for a second tenant, said second field having a second data type, wherein the second data type is different than said first data type. The method also typically includes storing the data values of first and second fields to a single column in the data structure when records having data values in the first and second fields are created by the first and second tenants, wherein the single column includes data values having different data types for different tenants, and copying to a first one of the index columns the data values stored in the single data column for the first field in response to a request from the first tenant to index data in the first data field.

According to another aspect of the present invention, a computer-implemented method is provided for hosting multiple tables for one or more organizations in a single multi-tenant data structure. The method typically includes defining a multi-tenant data structure having a primary key column, an organization id column and a plurality of physical data columns, defining a first table for a first tenant, the first table having a first data field, and the first tenant having a first tenant id, assigning a first table id to the first table, defining a second table for a second tenant, the second table having a second data field, and the second tenant having a second tenant id, and assigning a second table id to the second table. When records are created for the first table by the first tenant, for each created record, the method typically includes storing the value of the first data field to a single data column in the data structure, storing the first tenant id in the organization id column, and storing the first table id to the primary key column. When records are created for the second table by the second tenant, for each created record the method typically includes storing the value of the second data field to the single data column in the data structure, storing the second tenant id in the organization id column, and storing the second table id to the primary key column, wherein the first and second tables of the first and second tenants are stored in the data structure.

According to yet another aspect of the present invention, a computer-implemented method is provided for storing multiple tables for one or more tenants in a single data structure. The method typically includes defining a data structure having a primary key column, an organization id column and a plurality of data columns, defining a first table for a first tenant, the first table having a first data field, the first data field having a first data type, and the first tenant having a first tenant id, assigning a first table id to the first table, defining a second table for the first tenant, the second table having a second data field, the second data field having a second data type different from the first data type, and assigning a second table id to the second table. When records are created for the first table, for each created record, the method typically includes storing the value of the first data field to a single data column in the data structure, storing the first tenant id in the organization id column, and storing the first table id to the primary key column. When records are created for the second table, for each created record, the method typically includes storing the value of the second data field to the single data column, storing the first tenant id in the organization id column, and storing the second table id to the primary key column, wherein the first and second tables of the first tenant are stored in the data structure, and wherein said single data column includes data values having said first and second data types.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

FIG. 6a illustrates a custom field definition metadata table according to an embodiment of the present invention.

FIG. 6b illustrates a metadata table used to record the name and other information for each custom entity object defined for each organization according to an embodiment of the present invention.

FIG. 7 illustrates an example of a standard entity table including standard columns and custom field columns, as well as examples of actual data values for multiple fictitious organizations.

FIG. 8 illustrates an example of a custom entity object including a custom table having data values for a fictitious organization.

DETAILED DESCRIPTION OF THE INVENTION

Figure 1:
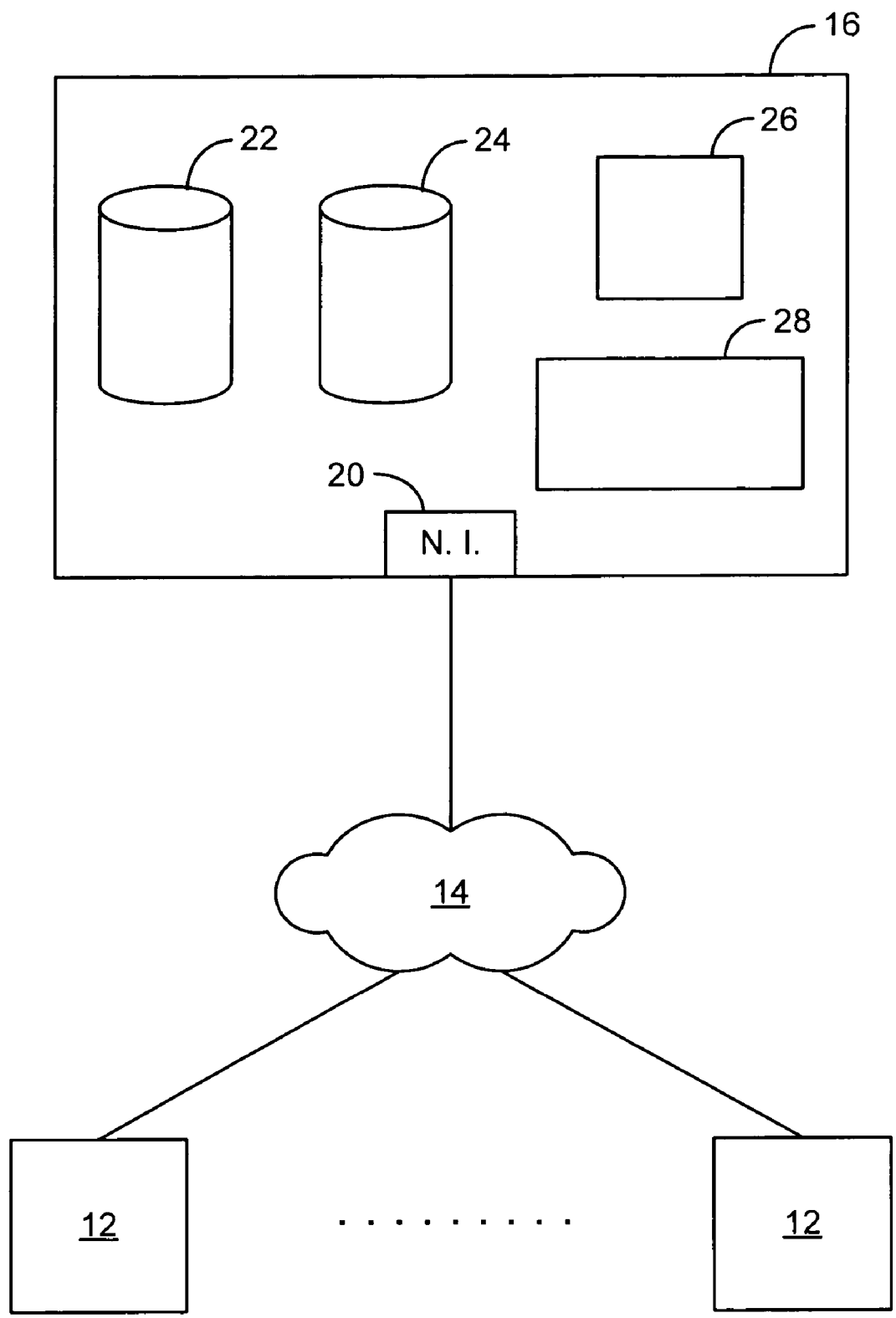
FIG. 1 illustrates an environment wherein a multi-tenant database system (MTS) might be used according to one embodiment.

FIG. 1 illustrates an environment wherein a multi-tenant database system might be used. As illustrated in FIG. 1 (and in more detail in FIG. 2) any user systems 12 might interact via a network 14 with a multi-tenant database system (MTS) 16. The users of those user systems 12 might be users in differing capacities and the capacity of a particular user system 12 might be entirely determined by the current user. For example, where a salesperson is using a particular user system 12 to interact with MTS 16, that user system has the capacities allotted to that salesperson. However, while an administrator is using that user system to interact with MTS 16, that user system has the capacities allotted to that administrator.

Network 14 can be a LAN (local area network), WAN (wide area network), wireless network, point-to-point network, star network, token ring network, hub network, or other configuration. As the most common type of network in current use is a TCP/IP (Transfer Control Protocol and Internet Protocol) network such as the global internetwork of networks often referred to as the "Internet" with a capital "I," that will be used in many of the examples herein, but it should be understood that the networks that the present invention might use are not so limited, although TCP/IP is the currently preferred protocol.

User systems 12 might communicate with MTS 16 using TCP/IP and, at a higher network level, use other common Internet protocols to communicate, such as HTTP, FTP, AFS, WAP, etc. As an example, where HTTP is used, user system 12 might include an HTTP client commonly referred to as a "browser" for sending and receiving HTTP messages from an HTTP server at MTS 16. Such HTTP server might be implemented as the sole network interface between MTS 16 and network 14, but other techniques might be used as well or instead. In some implementations, the interface between MTS 16 and network 14 includes load sharing functionality, such as round-robin HTTP request distributors to balance loads and distribute incoming HTTP requests evenly over a plurality of servers. Preferably, each of the plurality of servers has access to the MTS's data, at least as for the users that are accessing that server.

In preferred aspects, the system shown in FIG. 1 implements a web-based customer relationship management (CRM) system. For example, in one aspect, MTS 16 can include application servers configured to implement and execute CRM software applications as well as provide related data, code, forms, web pages and other information to and from user systems 12 and to store to, and retrieve from, a database system related data, objects and web page content. With a multi-tenant system, tenant data is preferably arranged so that data of one tenant is kept separate from that of other tenants so that one tenant does not have access to another's data, unless such data is expressly shared.

One arrangement for elements of MTS 16 is shown in FIG. 1, including a network interface 20, storage 22 for tenant data, storage 24 for system data accessible to MTS 16 and possibly multiple tenants, program code 26 for implementing various functions of MTS 16, and a process space 28 for executing MTS system processes and tenant-specific processes, such as running applications as part of an application service.

Several elements in the system shown in FIG. 1 include conventional, well-known elements that need not be explained in detail here. For example, each user system 12 could include a desktop personal computer, workstation, laptop, PDA, cell phone, or any WAP-enabled device or any other computing device capable of interfacing directly or indirectly to the Internet or other network connection. User system 12 typically runs an HTTP client, e.g., a browsing program, such as Microsoft's Internet Explorer™ browser, Netscape's Navigator™ browser, Opera's browser, or a WAP-enabled browser in the case of a cell phone, PDA or other wireless device, or the like, allowing a user (e.g., subscriber of a CRM system) of user system 12 to access, process and view information and pages available to it from MTS 16 over network 14. Each user system 12 also typically includes one or more user interface devices, such as a keyboard, a mouse, touch screen, pen or the like, for interacting with a graphical user interface (GUI) provided by the browser on a display (e.g., monitor screen, LCD display, etc.) in conjunction with pages, forms and other information provided by MTS 16 or other systems or servers. As discussed above, the present invention is suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium processor or the like. Similarly, MTS 16 (and additional instances of MTS's, where more than one is present) and all of their components might be operator configurable using application(s) including computer code run using a central processing unit such as an Intel Pentium processor or the like, or multiple processor units. Computer code for operating and configuring MTS 16 to intercommunicate and to process web pages and other data and media content as described herein is preferably downloaded and stored on a hard disk, but the entire program code, or portions thereof, may also be stored in any other volatile or non-volatile memory medium or device as is well known, such as a ROM or RAM, or provided on any media capable of storing program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C++, HTML, Java, JavaScript, any other scripting language, such as VBScript and many other programming languages as are well known.

According to one embodiment, each MTS 16 is configured to provide web pages, forms, data and media content to user systems 12 to support the access by user systems 12 as tenants of MTS 16. As such, MTS 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., RDBMS) as is well known in the art. It should also be understood that "server system" and "server" are often used interchangeably herein. Similarly, the databases described herein can be implemented as single databases, a distributed database, a collection of distributed databases, a database with redundant online or offline backups or other redundancies, etc., and might include a distributed database or storage network and associated processing intelligence.

Figure 2:
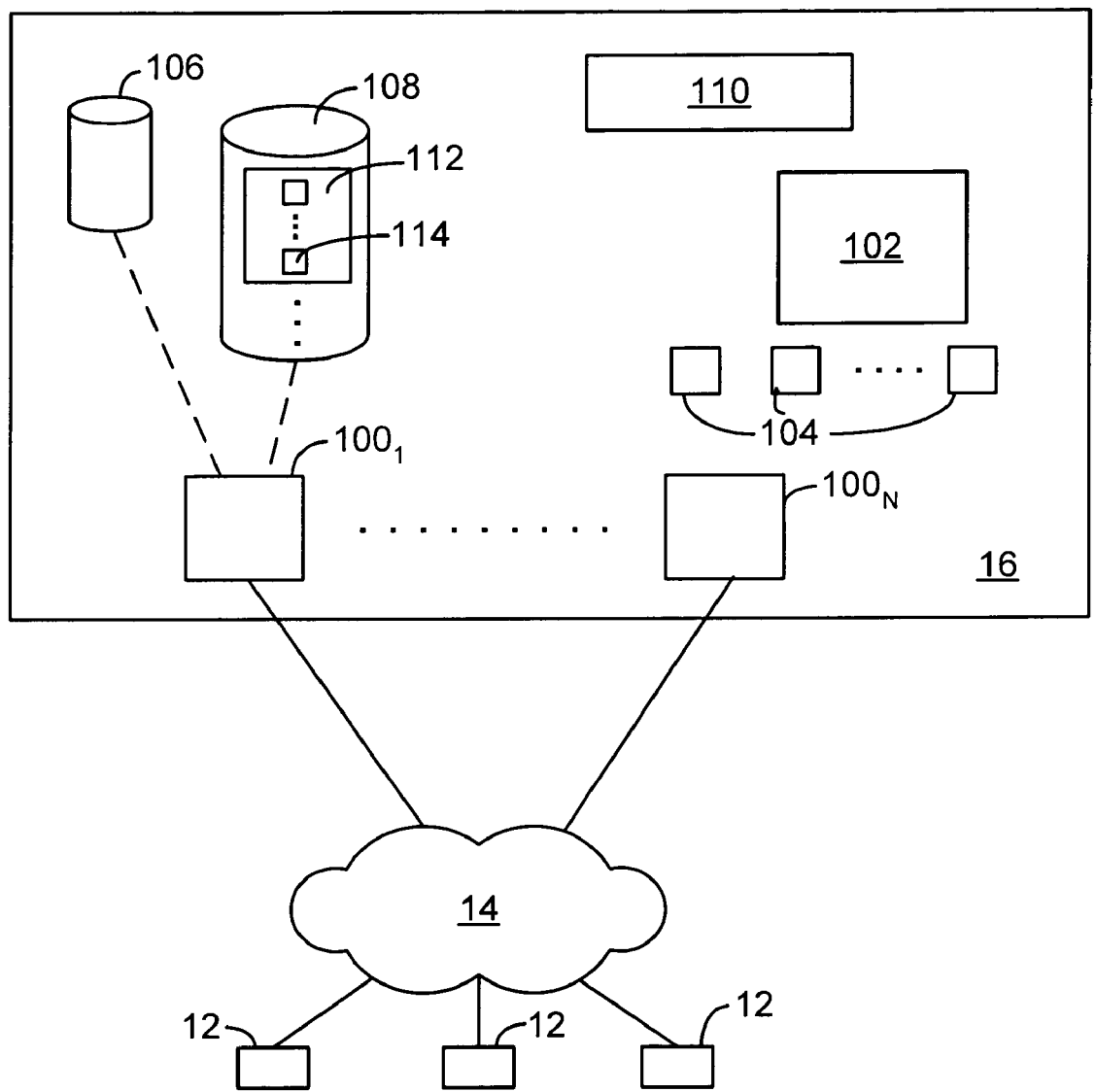
FIG. 2 illustrates elements of an MTS and interconnections therein in more detail according to one embodiment.

FIG. 2 illustrates elements of MTS 16 and various interconnections in more detail. In this example, the network interface is implemented as one or more HTTP application servers 100. Also shown is system process space 102 including individual tenant process spaces 104, a system database 106, tenant database(s) 108 and a tenant management process space 110. Tenant database 108 might be divided into individual tenant storage areas 112, which can be either a physical arrangement or a logical arrangement. Within each tenant storage area 112, user storage 114 might similarly be allocated for each user.

It should also be understood that each application server 100 may be communicably coupled to database systems, e.g., system database 106 and tenant database(s) 108, via a different network connection. For example, one server $100_1$ might be coupled via the Internet 14, another server $100_{N-1}$ might be coupled via a direct network link, and another server $100_N$ might be coupled by yet a different network connection. Transfer Control Protocol and Internet Protocol (TCP/IP) are preferred protocols for communicating between servers 100 and the database system, however, it will be apparent to one skilled in the art that other transport protocols may be used to optimize the system depending on the network interconnect used.

In preferred aspects, each application server 100 is configured to handle requests for any user/organization. Because it is desirable to be able to add and remove application servers from the server pool at any time for any reason, there is preferably no server affinity for a user and/or organization to a specific application server 100. In one embodiment, therefore, an interface system (not shown) implementing a load balancing function (e.g., an F5 Big-IP load balancer) is communicably coupled between the servers 100 and the user systems 12 to distribute requests to the servers 100. In one aspect, the load balancer uses a least connections algorithm to route user requests to the servers 100. Other examples of load balancing algorithms, such as round robin and observed response time, also can be used. For example, in certain aspects, three consecutive requests from the same user could hit three different servers, and three requests from different users could hit the same server. In this manner, MTS 16 is multi-tenant, wherein MTS 16 handles storage of different objects and data across disparate users and organizations.

As an example of storage, one tenant might be a company that employs a sales force where each salesperson uses MTS 16 to manage their sales process. Thus, a user might maintain contact data, leads data, customer follow-up data, performance data, goals and progress data, etc., all applicable to that user's personal sales process (e.g., in tenant database 108). In the preferred MTS arrangement, since all of this data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's sales data might be separate from other users' sales data regardless of the employers of each user, some data might be organization-wide data shared or accessible by a plurality of users or all of the sales force for a given organization that is a tenant. Thus, there might be some data structures managed by MTS 16 that are allocated at the tenant level while other data structures might be managed at the user level. Because an MTS might support multiple tenants including possible competitors, the MTS should have security protocols that keep data, applications and application use separate. Also, because many tenants will opt for access to an MTS rather than maintain their own system, redundancy, up-time and backup are more critical functions and need to be implemented in the MTS.

In addition to user-specific data and tenant-specific data, MTS 16 might also maintain system level data usable by multiple tenants or other data. Such system level data might include industry reports, news, postings, and the like that are sharable among tenants.

In certain aspects, client systems 12 communicate with application servers 100 to request and update system-level and tenant-level data from MTS 16 that may require one or more queries to database system 106 and/or database system 108. MTS 16 (e.g., an application server 100 in MTS 16)

generates automatically one or more SQL statements (the SQL query) designed to access the desired information.

Each database can generally be viewed as a collection of objects, such as a set of logical tables, containing data fitted into predefined categories. A "table" is one representation of a data object, and is used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided. For CRM database applications, such standard entities might include tables for Account, Contact, Lead and Opportunity data, each containing pre-defined fields.

Custom Fields

According to one embodiment, for a table such as one for a standard entity, an additional set of one or more columns, e.g., 10, 100, or 250 columns, of text data are defined in the physical schema. These additional columns, also referred to herein as custom data columns, custom field columns or custom fields, allow a system administrator to define additional fields that are not included in the pre-defined standard fields for that entity. These custom fields preferably have a data-type of VARCHAR (variable length character). In one aspect, these custom fields are preferably stored out of row from the main entity table, although these fields may be stored in the main table. For example, if the main table is called "sales.account" then the custom field data might be stored in a table called "sales.account_cfdata" where "cf" stands for "custom field." Both of these tables preferably contain an organization_id column to distinguish tenant rows, as well as the same indexed primary key (e.g., account id, in this case) that identifies those rows throughout the database. Furthermore, both tables are preferably partitioned physically on the DB (e.g., Oracle DB) to encourage parallelization, for example, when necessary to act on the entire table for maintenance purposes and to maintain shallower indexes.

Figure 3:
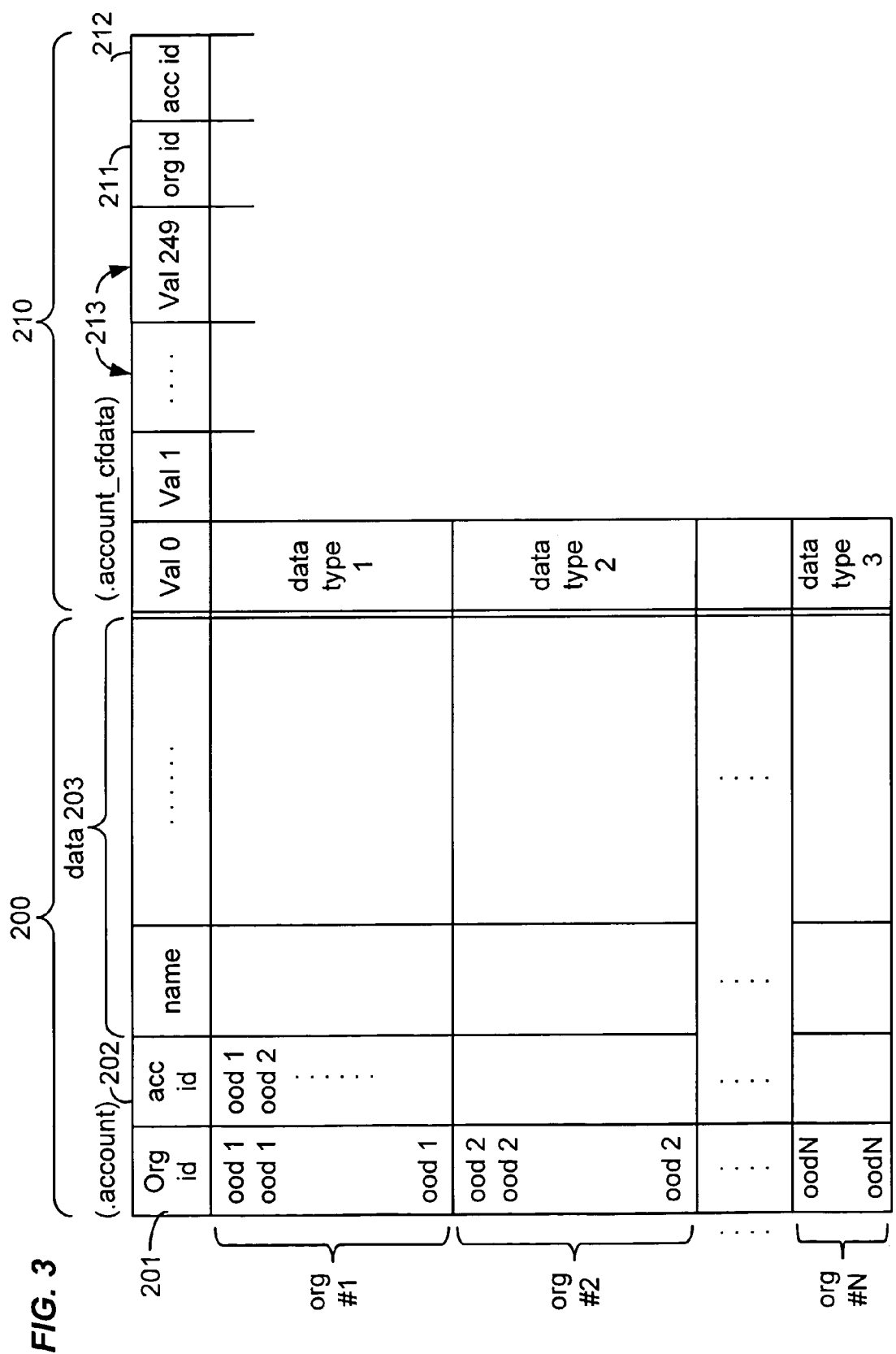
FIG. 3 illustrates an example of objects represented as a standard main table and an associated custom field table according to an embodiment of the present invention.

FIG. 3 illustrates an example of objects represented as a main table 200 and an associated custom field table 210. In the specific example shown in FIG. 3, the main table 200 (.account) represents a standard Account entity and the custom field table 210 (.account_cfdata) includes the custom fields defined by the various organizations (tenants) using the main table 200. As shown, main table 200 includes an organization ID ("org id") column 201 and a table ID (e.g., "acc id" for .account id) column 202 that acts as the primary key for table 200. Data table 200 also includes a plurality of data columns 203. In the specific example of FIG. 3, where the table represents a standard entity, data columns 203 are the predefined data columns, or standard fields, that are provided to the various organizations that might use the table. In the standard Account entity example, such standard fields might include a name column, a site column, a number of employees column and others as would be useful for storing account-related information. Each of the data columns 203 is preferably defined to store a single data type per column. The org id column 201 is provided to distinguish among organizations using the multi-tenant account table 200. As shown, N different organizations have data stored in table 200. The org ids in column 201 are preferably Char(15), but may include other data types. In one aspect, the first 3 characters of the org id is set to a predefined prefix, such as "00d", although another subset of characters in the org id may be used to hold such a prefix if desired.

Custom field table 210 similarly includes an org id column 211, a table id column 212 and plurality of data columns 213. As above, table id column 212 acts as the primary key for table 210 and preferably includes the same values as table id column 202 of table 200. In the specific example shown, there are 250 data columns 213 labeled as val0, val1 . . . val249. It is appreciated that any other number may be used as desired, such as, for example, 10 or 100.

When an organization is created initially and associated with database table 200, the custom field columns 213 are empty for that organization. However, every time a record or row is created in the main table (e.g., account) a corresponding row is created in the custom field table—all custom field columns are Null, and therefore take up no space until used.

In one aspect, data is only allowed to enter these custom fields when a new "column" for the organization is defined, e.g., by the administrator for that organization. For example, in the Account entity example, it may be desirable for a specific organization to create one or more additional custom fields, in addition to the standard fields 203, to store specific types of data that may not be accounted for in the predefined standard fields. The present invention advantageously allows an organization to create additional custom columns for such data. Rather than defining a physical column (in Oracle, the definition of which would be placed in the Oracle dictionary catalog) instead this definition is stored in metadata, e.g., in a metadata catalog, which may include one or more metadata tables. The definition of a physical column could likewise be stored in XML or some other format.

FIG. 6a illustrates an example of a custom field definition metadata table 500 ("custom_field_definition") according to an embodiment of the present invention. Custom_field_definition metadata table 500 is used to record the name, datatype and other information for each custom field column defined for each organization and table (e.g., standard tables and custom tables, which will be described in more detail below). As shown, metadata table 500 includes custom_field_definition_id column 510, organization_id column 520, table name or id column 530, field name column 540, field datatype column 550, is_indexed column 560 and a column_number column 570. Organization_id column 520 stores the org id of the organization for which the custom field is created, and the custom_field_definition_id column is the primary key for table 500. Table name column 530 stores the names of standard entity tables, such as Account, or the id of custom entity tables created for an organization. Field name column 540 stores the text name of the custom field, and field datatype column 550 stores the data type for the custom field. Examples of data types include text, number, date, picklist, etc. A picklist data type is a text field where the value is chosen from an enumerated list of values. A picklist is typically displayed as a dropdown in the UI. Is_indexed column 560 stores a value indicating whether the field has been flagged for indexing, which will be described in more detail below. In one aspect, column 560 stores a boolean value. Column_number column 570 stores the column number (e.g., "val0") assigned to a custom field in custom field table 210 (FIG. 3).

The creation of a new custom field in the application allocates one of the custom field columns 213 to hold the data. In preferred aspects, the lowest numbered columns are filled first. For example, as shown in FIG. 3, the "val0" column is filled first and then the "val1 " column and so on for each organization. Therefore, depending on the number of custom columns defined by an organization, each custom field 213 may or may not contain data for an organization. Now, when users of the application in an organization edit rows for that table, the new custom field appears on the screen (or via the API), which will appear the same as all the other standard fields. However, when this data is persisted in the database, the value of the custom field is stored in the designated custom field column in the separate custom field table 210, instead of in the standard main table 200.

In one aspect, a variety of virtual data-types are allowed for these custom fields even though the underlying physical storage may be character based. When the organization's system administrator defines numeric or date custom field types, for instance, then the values are stored as text in a canonical format that allows easy conversion back to the logical data-type. As mentioned earlier, in one aspect, a data type of VARCHAR is preferably used. For instance, in this aspect, dates are stored in the YYYYMMDD format—which allows for conversion via the TO_DATE(<column>, 'YYYYM-MDD') function and also allows for proper sorting without doing any conversion. For numbers, the usual decimal format is used, and the Oracle function TO_NUMBER( ) may be used to convert back to numeric values for sorting, mathematical operations, and filtering, etc.

Because the database is multi-tenant, a given physical custom field column may contain data across multiple organizations. For example, because an organization is not limited to specific data types, one organization may define one data type such as a date and another organization may define a different data type such as a string or a number. Therefore it is likely that strings, numbers, and dates will all be found in one physical custom field column. FIG. 3 illustrates an example of a custom field column containing different data types. As shown in the "val0" custom column, for example, the custom column data type defined by organization 1 is data type 1, the custom column data type defined by organization 2 is data type 2, and the custom column data type defined by organization N is data type 3. Data types 1, 2 and 3 may be the same or they may be different. For example, data type 1 may be text, data type 2 may be date, and data type 3 may be number. FIG. 7, and the related discussion below, illustrates an example where different data types are mixed in a custom field column. In one aspect, a separate pool of columns is provided for custom fields of different data types, i.e., each of the custom field columns in the separate pool contains a single data type.

In one embodiment, metadata is used to determine the data type(s) in a given custom field column. That is, metadata is used to track the logical data type for each organization in each custom column. In one aspect, a mapping function is created from the metadata. For example, when an organization defines a custom field for a standard entity, a custom field definition is stored in metadata table 500 including the organization id for that organization, the table name (e.g., .account_cfdata) and the column number assigned in the custom table (e.g., val0). In this manner, the data type(s) in any custom column can be determined for efficient data retrieval given the column number, table name and organization id.

Custom Field Indexing

Now consider the problem of indexing the data in these custom field columns (e.g., columns 213) to allow for fast retrieval. For example, users expect to filter on date values as dates and numeric values as numbers. However, in order for these filters to work efficiently, given the expressions above used to convert their values, it would be necessary to place a functional index (e.g., an Oracle DB functional index) on each organization's slice of the data in a given custom field column. This is not possible from the Oracle DB perspective because the Oracle DB does not understand that one physical column contains data in multiple formats. For example, if one tries to create an index on the TO_DATE or TO_NUMBER expressions above, an error would result since other textual values in that physical column would not conform to the desired format.

Similarly, when searching on string data, users expect case insensitive searches. That is, searching for "car" should find "CAR" or "CaR." However, the definition of case insensitive is language dependent, and a service (e.g., CRM service) using such a multi-tenant database structure may be multi-language enabled. To search properly on multi-language data requires the use of a functional index built using various NLS (natural language standards) functions in Oracle. Since a given physical column could contain data in multiple languages it would be necessary to build N different indexes for each of the languages supported which would result in a non-scalable solution.

For the reasons listed above, such "Indexed Custom Fields" are implemented in one embodiment by storing data in a separate set of indexed columns. According to one embodiment of the present invention, a plurality of additional index columns are provided to allow for indexing custom fields. When a custom field is flagged for indexing by a database administrator, one of the plurality of index columns is allocated to that flagged column. Data from the flagged column is copied to the allocated index column. The data is stored in the index column in a format that facilitates searching, e.g., for dates and strings. For example, the YYYYM-MDD is itself a searchable format as strings in that format can be compared lexically using normal string comparison.

Figure 4:
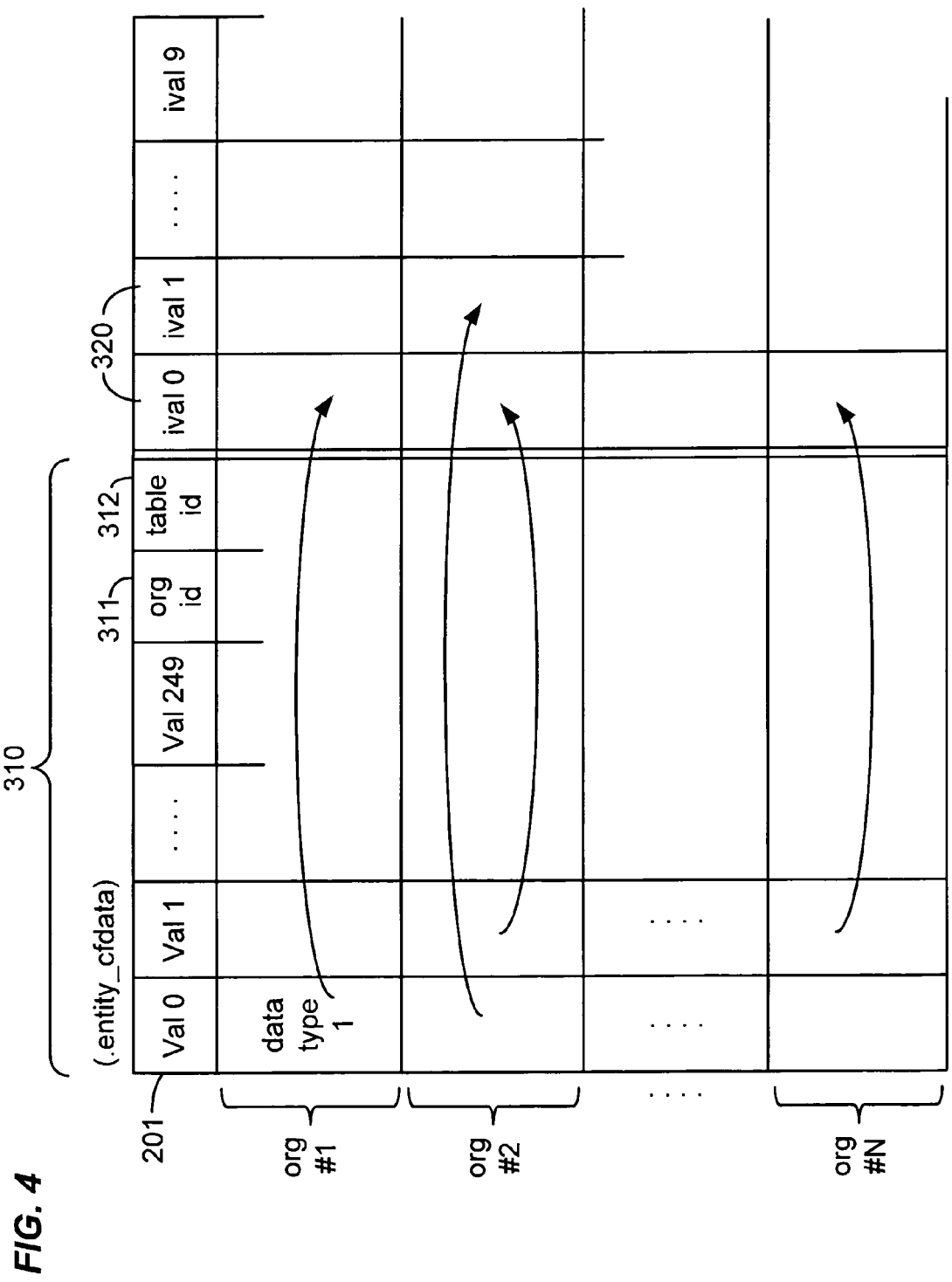
FIG. 4 illustrates a custom object represented as a custom field table 310 including physical index columns 320 according to one embodiment.

FIG. 4 illustrates an example of a custom object represented as a custom field table 310 including physical index columns 320 according to one embodiment. In one aspect, each custom field data table contains multiple (e.g., 10, 100, 250, etc.) physically indexed columns 320, e.g., using standard Oracle B*Tree indexes. In an example with 10 indexed columns, an administrator can therefore designate up to 10 custom fields, of string or date types, to be indexed. When a custom field is flagged for indexing, the data in the original column (which is still maintained to display the unmodified format to the user when necessary) is copied to one of these indexed columns. For example, as shown in FIG. 4, custom data field "val0" was flagged by the system administrator for organization 1 as an indexed custom column. Data from this flagged column is copied to the index column "ival0". Similarly, custom data field "val1" was flagged by the system administrator for organization 2 as an indexed custom column, and the data from this flagged column is copied to index column "ival0". At some later time, the system administrator for organization 2 may have flagged another custom field column and the data for this column is copied to another index column (e.g., column "val0" data copied to column "ival1" as shown in FIG. 4). In one aspect, similar to the custom fields, the lowest numbered index columns are preferably used or filled first.

In one aspect, to avoid the problem with searching across multiple languages, a "case folding" algorithm is implemented (e.g., in an application server) that converts each string custom field value to a universal case insensitive format. One such case folding algorithm is an algorithm defined by the Unicode Consortium in the Unicode 4.0 standard, section 3.13—Caseless Matching, hereby incorporated by reference, which is a tabular lookup function that converts characters to a form that is binary comparable independent of case for all languages that have a concept of case. Whenever values in the original custom field column are searched, the SQL instead filters on the corresponding case-folded indexed column after performing the same case folding operation on the literal being searched. Dates need not be modified from their YYYYMMDD format, which is also included in the index (unmodified) as text.

Organizations that choose not to use indexed custom fields will have null values in these fields, and Nulls do not take up any space in the indexes. In this manner space is used up in the database only as custom columns are actually indexed. Also, index columns 320 are preferably stored in the corresponding custom field table, however, they may be stored out of row, in which case it is preferred that the org id 311 and table id 312 columns be copied to the separate indexed column table to facilitate searching.

Custom Field Uniqueness

Another desired schema feature is the concept of a uniqueness constraint. Again, a unique index cannot be placed on a custom field physical column because, although the values may be unique for one organization, they may not be unique for some other organization that shares that physical column. For example, it is possible that two records for two different organizations would have the same exact data value stored in the same custom field.

To implement this uniqueness feature, in one aspect, a separate table is provided that contains only the data values for customers who require uniqueness. Once the organization administrator has enabled a custom field for uniqueness, all values for that organization are inserted in this unique index table, and ongoing changes to that custom field column are updated synchronously to the unique index table (described below). If either of these operations causes an Oracle DB unique index violation then the error is passed back to the end user—the administrator would need to "clean up" the data in a field before declaring it unique.

One schema for a unique index maintenance table is as follows:
1. organization_id
2. custom field definition id
3. custom field value This schema allows multiple custom fields from the same organization (and entity) to be indexed. The first two columns are preferably compressed in the Oracle DB unique index since that would make the physical index smaller, and this table could be index organized since its only purpose as a table is to be used as a unique index.

Custom Tables

It is also desirable to create whole new logical entity tables (entities) for the purpose of extending a base application or for integrating with other systems. For example, an organization using the standard entities provided by the system may desire that one or more new entities be created to specifically cater to, and to facilitate data storage and retrieval for, that organization's particular business model. Accordingly, one embodiment of the present invention provides the functionality to create custom entity tables or custom entities.

As with the approach for custom fields, all custom entity data rows are stored in a single multi-tenant physical table according to one embodiment. However, unlike standard custom field tables, the custom entity data table in one aspect contains multiple logical tables per organization. It is transparent to customers that their multiple "tables" are in fact stored in one large table.

Figure 5:
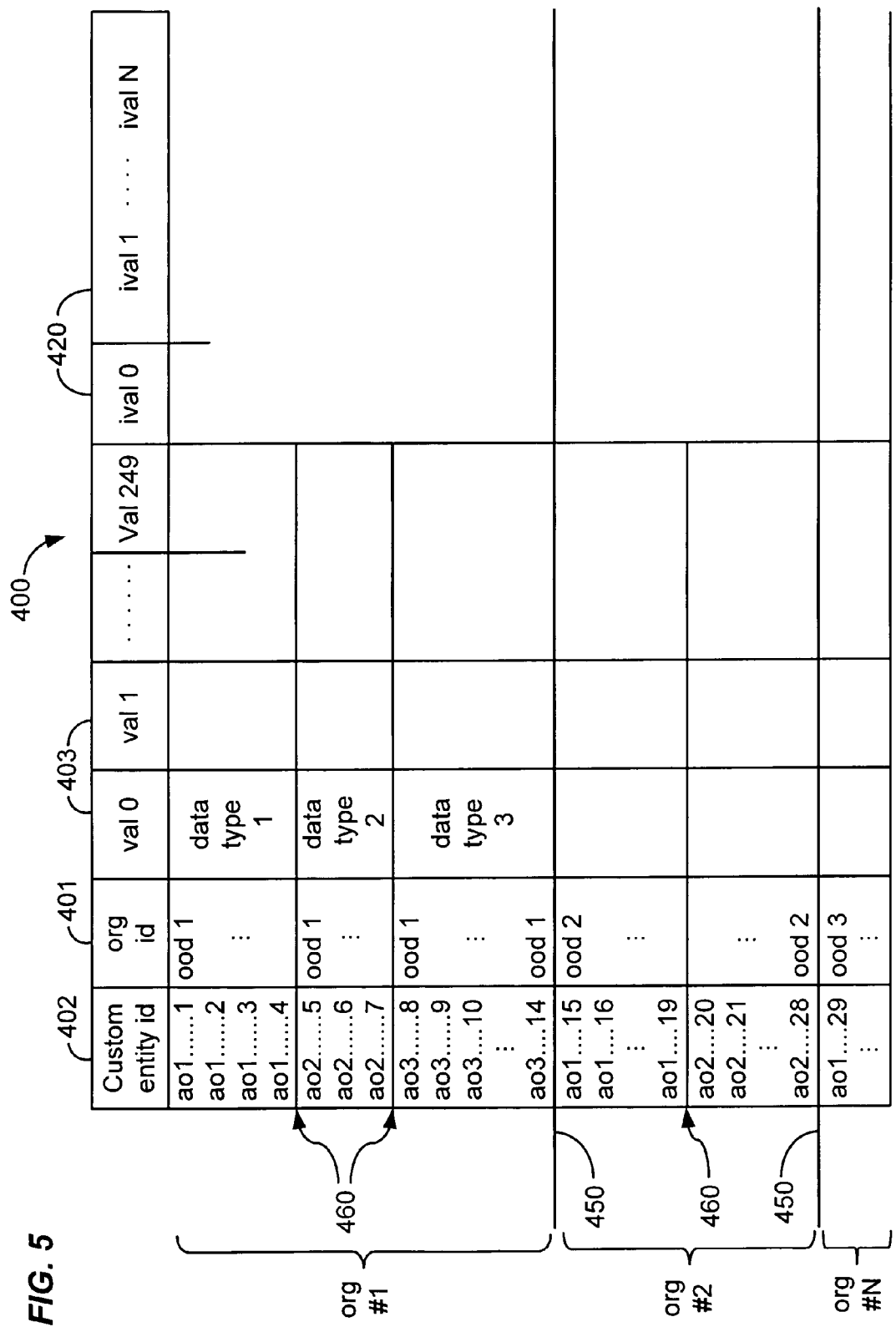
FIG. 5 illustrates an example of a custom object represented as a custom entity table according to one embodiment.

FIG. 5 illustrates an example of a custom object represented as a custom entity table 400 according to one embodiment. Table 400 includes an org id column 401, a custom entity id column 402 and a plurality of custom field columns 403 (labeled "val0", "val1", . . . ). A plurality of optional index columns 420 (labeled "ival0", "ival1", . . . ) may also be provided. The org id column is used to distinguish among the various organizations populating table 400. For example, multiple organizations may create custom entities, all of which are stored to table 400 in one aspect. Custom entity id column 402 is used to distinguish among the various custom entity tables stored in table 400. Custom entity id column 402 also acts as the primary key column for table 400. Custom field columns 403 are used to store the data for the various custom entities defined by the various organizations. Specifically, custom field columns 403 store the columns defined for each of the various custom entities defined by the various organizations populating table 400. Index columns 420 are implemented similar to custom field indexed columns 320 described above with reference to FIG. 4.

According to one embodiment, the first 3 characters of the globally unique primary key field 402 are used to identify the specific entity type. This technique advantageously allows for multiple custom entity types for one organization to be distinguished in this one custom entity table 400 as will be discussed below. It will be appreciated, however, that fewer or more than the first 3 characters of the primary key may be used to identify entities, or that any subcombination of characters of the primary key may be used.

When an organization administrator defines a new custom entity, the definition is stored in the metadata instead of the underlying data dictionary. FIG. 6b illustrates an example of a custom entity definition metadata table 600 ("custom_entity_definition") according to an embodiment of the present invention. When a new custom entity is defined, the database system allocates a unique (within that organization) 3-character prefix for rows of that entity type. In one aspect, the letter 'a' is chosen as the first character of all custom entity primary keys, e.g., a01 . . . a02 . . . a03 . . . aMN . . . as shown in column 402 of table 400. As shown, across all organizations the same 3-character prefix may be re-used. For example, "a01" is reused as a prefix for multiple organizations. However, the remainder of the custom entity id ensures global uniqueness (and that data from different organizations is never mingled). In one aspect, these 3-character id's are encoded in base62, so that each initial character allows for 62*62=3844 different custom entity types per organization—a large enough number for virtually all uses. It should be appreciated, however, that different encoding bases may be used to provide a fewer or greater number of custom entity types per organization. It should also be appreciated that the custom entity id field may be a composite primary key, for example, spanning two or more columns, one column for the prefix and the other column(s) for the remainder of the custom entity id. For the sake of simplicity, row partitions are not shown in table 400, however organization partitions 450 and entity partitions 460 are shown.

Referring to FIG. 6b, custom_entity_definition metadata table 600 is used to record the name and other information for each custom entity object defined for each organization. As shown, metadata table 600 includes custom_entity_definition_id column 610, organization_id column 620, entity_name column 630, and key prefix column 540. Organization_id column 620 stores the org id of the organization for which the custom entity is created, and the custom_entity_definition_id column 610 is the primary key for table 600. Entity name column 630 stores the names of the custom entity table, e.g., as a text datatype. Key prefix column 640 stores the 3-character prefix (e.g., "a01", "a02", etc.) allocated for rows of that entity type.

When creating a custom entity table, the administrator for an organization specifies a unique (within the organization) developer name for the custom entity—this is the name used to identify that particular entity for API calls and other developer entry points into the system. This name is stored in the entity name column 630 of table 600. Custom fields may also be defined for custom entities, and where desired, custom fields may be flagged for indexing, as described above. Once custom fields are defined for the custom entity, the organization can begin to use that custom entity like any other standard entity. For example, all API operations (e.g., describe, insert, update, delete, query, search) are available and the organization may define a user interface for editing that custom entity in an online application. Transparent to the users and organization, however, the custom entity table is stored in a single custom entity table 400 along with other custom entity tables defined by that organization as well as other organizations.

One difference in terms of SQL when operating on a custom entity table is the need to filter on the custom entity id in addition to the organization id to ensure that the data from multiple logical entity types within one organization are not mixed together. For example, the leading 3-character portion of the primary key index (e.g., a01 . . . aMN) can be used for this efficient filtering. Thus, filtering on the organization id and the 3-character prefix provides a determination of a specific entity type for the organization. Similarly, an insert PL/SQL call should be told which 3-character prefix to use when inserting a new primary key value and custom entity row.

Similar to custom field columns 213 of FIG. 3, custom field columns 403 may contain multiple data types. For example, when organization #1 defines custom entity table 1 (identified by "a01" for org 1 "00d1" in table 400) a custom field column definition having data type 1 may be allocated to the "val0" column as shown. Similarly, a custom field column definition for a second custom entity table (identified by "a02" for org 1) having data type 2 may be allocated to the same "val0" column as shown. Data types 1 and 2 may be the same or different. In this manner, it is possible that numerous data types may be stored in any given custom field column 403 in custom entity table 400 for the various custom entities defined by the various organizations. Accordingly, using optional index fields 420, an organization is able to flag one or more columns in its custom entities for indexing as described above. Filtering would also proceed similar to that discussed above.

In one embodiment, foreign keys may be defined as a data type when creating custom entities. In this manner a relationship with a standard entity, or another custom entity may be provided to facilitate data storage and retrieval (e.g., reduce redundant data storage). For example, when defining a custom entity, a system administrator may define a custom field as a foreign key data type to establish a relationship with one or more other entities. The primary key for the related entity is copied and stored in that custom field. In one aspect, a plurality of columns is provided to store custom fields of type foreign key. These separate columns may be indexed.

Specific Examples

FIG. 7 illustrates an example of a standard entity table 700 including standard columns 703 and custom field columns 713, as well as examples of actual data values for multiple organizations. As shown, the standard table 700 represents an Account entity having a standard name field and other standard fields 703. In this example, ABC Corp. (identified by "00d1" in org id field 701) has defined a custom column for "account web address" that has been allocated to the val0 column. The data type for this custom field is defined as text. Additionally, ABC Corp. has defined a second custom field for "account stock price", which has been allocated to the val1 column, and a third custom field for "account ticker symbol", which has been allocated to another column. The data types for these columns are number and text, respectively. Similarly, 123 Corp. (identified by "00d2" in org id field 701) and XYZ Corp. (identified by "00dN" in org id field 701) have each defined a custom field for "account next annual meeting date" and "account fiscal year", respectively. The data types for these custom fields are date and picklist, respectively. These custom fields have both been allocated to the val0 column, even though their data types are different. The definitions of these custom fields are stored to metadata, e.g., metadata table 500, as discussed above.

As shown, table 700 holds account data for ABC Corp. including specific account data for "IBM", "Dell" and "Apple" as shown. Similarly, table 700 also holds account data for 123 Corp. and XYZ Corp. As shown, both 123 Corp. and XYZ Corp. each have a specific entry for an account with the same name: "Disney". However, these entries are distinguished based on the globally unique primary key 702 (or 712). For example, for XYZ Corp., the account entry for "Disney" has a primary key value of "001 . . . 932", whereas the "Disney" account entry for 123 Corp. has a primary key value of "001 . . . 87". As above, the data values in the val0 custom column have mixed data types. For example, for ABC Corp. the "web address" field is text, whereas the "next annual meeting date" field for 123 Corp. has a date data type, and the "fiscal year" field for XYZ Corp. has a picklist data type.

FIG. 8 illustrates an example of a custom entity object 800 including an custom table 810 for ABC Corp. As shown, ABC Corp. (identified by "00d1" in org id column 801) has defined a custom object 810 to represent Assets. The definition of Assets object 810 is stored to metadata, e.g., in table 600 (FIG. 6b). Assets object 810 has been allocated the prefix "a02" for the custom entity id. Also, as shown, ABC Corp. has defined another custom object, e.g., identified by prefix "a01" in custom entity id column 802. A separate column may be provided in table 800 to store the prefixes (e.g., "a01") of the various objects stored in table 800. Assets object 810 has been defined with a custom foreign key column and various data columns. The custom foreign key (FK) column is allocated to the "Val0" column, whereas data fields for "asset name", "asset value", "asset depreciation type" and "asset replacement date" have been allocated to columns "Val1" to "Val4", respectively. In this example, the data types for these fields are text, number, picklist and date, respectively.

Assets object 810 is a child custom object of Account object 700. The custom foreign key column connects each row in object 810 to its parent account (in these examples, Account object 700 has been allocated a prefix of "001" for its table id). For example, the foreign key value "001 . . . 9" connects to the row in table 700 for account name "DELL". Similarly, the foreign key values "001 . . . 8" and "001 . . . 10" connect to the rows in table 700 for account names "IBM" and "APPLE", respectively. Also, as shown, XYZ Corp. (identified by "00dN" in org id column 801) has defined a custom object to suit their business needs, which custom object is also stored in table 800. As such, any given data column 803 may contain mixed data types depending on the definitions of the various custom objects stored in table 800.

Re-usable Services

One goal of custom entities is not only to support a grid of data (e.g., rows and columns configured by organizations/customers) but also to support the same set of application high-level semantic services exposed for standard entities. This provides for a system that is not only more than just an online data provider, but also an application-building infrastructure with rich re-usable services.

With reference to the salesforce.com service, several examples of such reusable services, and how they apply to custom entities, follow:

History Tracking

Standard entities in salesforce.com (such as Case and Opportunity entities) support automatic auditing of data changes to records. This auditing typically occurs at a low-level in the application server where all data is being written to the database. This same code path is preferably used with custom entities.

The same generalized schema used for standard entities works for custom entities as well—this is preferably a pivoted schema with one field delta per row:

1. organization_id
2. custom entity data id
3. custom field definition id
4. old value
5. new value.

However, it may be a non-pivoted schema. A non-pivoted schema has columns for each separate piece of information. It looks like an excel spreadsheet:

| ID | Name | Phone | Email address |
|---|---|---|---|
| 111 | Craig | 555-1212 | foo@bar.com |

A pivoted schema uses generic column names such as:

| ID | Property Name | Property Value |
|---|---|---|
| 111 | Name | Craig |
| 111 | Phone | 555-1212 |
| 111 | Email Address | foo@bar.com |

The pivoted schema has many more rows in it, but the rows are skinnier (imagine if there were 50 columns of data—that would turn into 50 rows in the pivoted schema, but the pivoted schema itself would have the same columns). So a normal schema is short and wide, whereas a pivoted schema is tall and skinny. A pivoted schema is useful, for example, for auditing purposes such as for providing a case history related list—where the user is shown every field value change as one row in a grid. Pivoted schemas, however, are typically difficult to use for normal data display like a detail screen with all the information for a person.

If the administrator "turns on" this property in the definition of the custom entity and custom field then this behavior happens automatically (changes are logged to this one multi-tenant auditing table). The data in this generic history table is available for display in the online application or via an API query.

As an example, consider changes made to a standard entity such as Case. The system might record the following history rows when edits to Case are saved:

| Org Id | Case Id | Field Name | Old Value | New Value | Date |
|---|---|---|---|---|---|
| 00d1 | 5001 | Subject | Problem with Disc drive | Problem with Disk Drive | Mar. 4, 2004 |
| 00d1 | 5001 | Status | Open | In Progress | Mar. 4, 2004 |
| 00d1 | 5001 | Priority | Low | Medium | Mar. 4, 2004 |
| 00d1 | 5002 | Status | Open | Closed | Mar. 5, 2004 |
| 00d1 | 5002 | Rep Name (custom) | Frank | Sally | Mar. 5, 2004 |

The above data records two edit operations, one for case 5001 that occurred on Mar. 4, 2004, and another for case 5002 that occurred on Mar. 5, 2004. Several fields were edited each time.

As another example, consider changes made to the Assets custom object 810 of FIG. 8. An example of history tracking rows for a single edit operation made on Mar. 4, 2004 might look like the following:

| Org Id | Cust Ent Id | Field Name | Old Value | New Value | Date |
|---|---|---|---|---|---|
| 00d1 | a02 | Asset Name | Laptop X | Laptop Y | Mar. 4, 2004 |
| 00d1 | a02 | Asset Value | 50 | 45 | Mar. 4, 2004 |
| 00d1 | a02 | Deprec. Type | Linear | Accelerated | Mar. 4, 2004 |

All this information is recorded automatically by the system. The user interface (UI) might present the information similar to that shown above, or in any other convenient format.

Permission Based Security and Sharing Model

Administrators may wish to restrict access to particular entity types from particular user profiles—in the same way that standard entities have permissions such as EDIT_ACCOUNT.

The administrator can define that a given entity type requires an explicit READ or EDIT permission. A generic profileCustomEntity metadata table (available for edit through the API) allows creation of relationship rows that associate a profile (read access) with a custom entity type and optionally declares whether users in that profile can edit rows in that entity type.

The common Application Server and PL/SQL code that retrieves and edits custom entity data can then check this metadata for the current user and reject the operation if the user does not have the proper permission.

In one aspect, a sharing model allows even finer granularity of access to rows—in addition to the permission checks above. The administrator, when defining a custom entity type, can choose whether the entity type is editable by all users (Public Read/Write), read-only for all users (Public Read/Only), or privately available only to the owner of a record or to users who are granted explicit sharing access to a record (Private).

To support the latter sharing model, in one aspect, a standard owner field is added to the custom entity data table and becomes available in the API. The same semantics attached to the owner field in other standard entities apply. For example, managers in the role hierarchy gain access to all records owned by a subordinate. Also, a generic sharing entity, e.g., customEntityShare, is used in one aspect for entering manual explicit sharing access for particular custom entity rows to users or groups—in the same way that the accountShare entity is available in the API (and UI) to allow granting explicit account access.

Currency Type

A standard field in custom entities is a single currency type that controls the currency of all numeric currency custom fields in that row. This functionality is consistent with all standard entities and allows for the same currency translation as elsewhere in the application.

Multiple Business Processes per Entity Type

Standard entities allow for the definition of multiple "Record Types" or business processes. For instance, an opportunity entity can have both telesales opportunities as well as direct sales opportunities. Depending on the record type of an individual opportunity row, the values available for picklist fields change as configured by the organization administrator.

Custom entities also allow for the specification of this same metadata by the administrator. The picklist custom fields in that entity are preferably affected in the same manner as for standard entities.

Workflow

In one aspect, the present invention provides for the definition of trigger conditions and actions for specific entity types. For instance, if an opportunity amount exceeds a particular value (trigger condition) then a notification, such as an email, is sent (action) to a predesignated individual or group, e.g., the VP of sales of that organization.

Once again the metadata used internally for defining these rules preferably operates similarly for custom entities as for standard entities. The code, e.g., executing in an application server or database server, that evaluates these conditions for each row edit occurs at a low level where both standard and custom entities are able to take advantage of this functionality.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of storing multiple tables for one or more tenants in a single data structure, comprising:

defining a data structure having a primary key column, an organization id column and a plurality of data columns;

defining a first table for a first tenant, said first table having a first data field, said first data field having a first data type, and said first tenant having a first tenant id;

assigning a first table id to the first table;

defining a second table for the first tenant, said second table having a second data field, said second data field having a second data type different from the first data type; and assigning a second table id to the second table;

wherein when records are created for the first table, for each created record:
 a) storing the value of the first data field to a single data column in the data structure,
 b) storing the first tenant id in the organization id column, and
 c) storing the first table id to the primary key column;

wherein when records are created for the second table, for each created record:
 a) storing the value of the second data field to said single data column,
 b) storing the first tenant id in the organization id column, and
 c) storing the second table id to the primary key column;

wherein the first and second tables of the first tenant are stored in the data structure, and said single data column includes data values having said first and second data types;

defining a third table for a second tenant, said third table having a third data field, said third data field having a third data type, and said second tenant having a second tenant id; and assigning a third table id to the third table;

wherein when records are created for the third table, for each created record:
 a) storing the value of the third data field to said single data column in the data structure;
 b) storing the second tenant id in the organization id column; and
 c) storing the third table id to the primary key column;

wherein the third table is stored in the data structure;

wherein said single data column includes data values having said first and second data types and said third data type;

wherein the first and second table ids are different; and wherein the third table id is the same as one of the first and second table ids.

* * * * *